United States Patent [19]

Brady et al.

[11] Patent Number: 5,619,616
[45] Date of Patent: Apr. 8, 1997

[54] VEHICLE CLASSIFICATION SYSTEM USING A PASSIVE AUDIO INPUT TO A NEURAL NETWORK

[75] Inventors: Mark J. Brady, Cottage Grove; Michael E. Hamerly, Vadnais Heights, both of Minn.

[73] Assignee: Minnesota Mining and Manufacturing Company, St. Paul, Minn.

[21] Appl. No.: 232,758

[22] Filed: Apr. 25, 1994

[51] Int. Cl.$^6$ .............................. G06E 1/00; G06E 3/00; G06F 15/18
[52] U.S. Cl. .............................................. 395/22
[58] Field of Search ............................. 395/20–25, 27, 395/2, 2.41, 2.4; 382/155–159; 367/131; 364/434; 381/41–43

[56] References Cited

U.S. PATENT DOCUMENTS

| | | | |
|---|---|---|---|
| 3,824,532 | 7/1974 | Vandierendonck | 340/15 |
| 3,895,344 | 7/1975 | Gill, Jr. et al. | 340/38 S |
| 4,360,795 | 11/1982 | Hoff | 340/38 R |
| 4,937,872 | 6/1990 | Hopfield et al. | 381/43 |
| 5,003,490 | 3/1991 | Castelaz et al. | 395/22 |
| 5,040,215 | 8/1991 | Amano et al. | 395/2.41 |
| 5,148,110 | 9/1992 | Helms | 324/323 |
| 5,377,163 | 12/1994 | Simpson | 367/131 |
| 5,404,306 | 4/1995 | Mathur et al. | 364/436 |
| 5,434,927 | 7/1995 | Brady et al. | 382/104 |
| 5,448,484 | 9/1995 | Bullock et al. | 364/436 |

FOREIGN PATENT DOCUMENTS 2383495  10/1978  France .................. G10L 1/02

OTHER PUBLICATIONS

Amano et al, "On the use of neural networks and fuzzy logic in speech recognition"; IJCNN, pp. 301–305 vol. 1, 18–22 Jun. 1989.

Nakamura et al, "Speaker adaptation applied to HMM and neural networks"; ICASSP–89, pp. 89–92 vol. 1, 23–26 May 1989.

Murdock, "Improvement of speech recognition and synthesis for disabled individuals using fuzzy neural net retrofits"; IEEE International conference on neural networks, pp. 251–258 vol. 2, 24–27 Jul. 1988.

AT&T IVHS NET–2000, AT&T NET–2000 SmartSonic™ Traffic Surveillance System.

*Business Week*, Developments to Watch, William D. Marbach, "An Electronic Ear for a Brainy Highway System of the Future", Apr. 26, 1993, p. 95.

Casselman et al.; "A Neural Network–Based Passive Sonar Detection and Classification Design with a Low False Alarm Rate"; Ocean Technologies and Opportunities in the Pacific for the 90's; Oct. 1–3, 1991; Honolulu, Hawaii; Proceedings; vol. 3.

Montana et al.; "Neural–network–based Classification of Acoustic Transients"; IEEE Conference on Neural Networks for Ocean Engineering; Aug. 15–17, 1991; Washington, D.C.

Meng et al, "a neural network motion predictor"; Third International conference on Artificial Neural Networks, pp. 282–291, 30 Mar. –2 Apr. 1993.

(List continued on next page.)

*Primary Examiner*—Tariq R. Hafiz
*Attorney, Agent, or Firm*—Gary L. Griswold; Walter N. Kirn; Kari H. Bartingale

[57] ABSTRACT

A system for classifying vehicles based on the sound waved produced by the vehicles receives analog sound pressure levels and converts them to a power spectrum. Fuzzification functions, such as asymmetric wedge shaped functions, are convoluted with the power spectrum to create a vector that characterizes the power spectrum while reducing the dimensionality of the characterizing vector. A neural network analyzes the characterizing vector and produces a classification designator indicative of the class of the object associated with the analog sound pressure levels received by the system.

22 Claims, 9 Drawing Sheets

OTHER PUBLICATIONS

Meng et al, "signal representation comparison for phonetic classification"; ICASSP 91., pp. 285–288 vol. 1, 14–17 May 1991f.

Hwang et al, "a translation/rotation/scaling/occlusion invariant neural network for 2d/3d objection classification"; ICASSP–92, pp. 397–400 vol. 2, 23–26 Mar. 1992.

Watanabe et al, "an ultrasonic visual sensor using a neural network and its application for automatic object recognition"; IEEE 1992 Ultrasonic Symposium, pp. 1191–1194 vol. 2, 20–23 Oct. 1992.

VEHICLE CLASSIFICATION SYSTEM USING A PASSIVE AUDIO INPUT TO A NEURAL NETWORK

FIELD OF THE INVENTION

This invention relates generally to classification of objects based on sound. More specifically, this invention relates to a system relying on passive sound for identifying the class of objects, particularly vehicles, using a classification neural network to generate class designators.

BACKGROUND OF THE INVENTION

With the ever increasing number of vehicles on the roadways, there is a need for improved and more efficient traffic management. One aspect of traffic management is identifying when a vehicle is present and classifying the vehicle. Since the 1950s, point detection devices, such as in-ground inductive loops, have primarily been used for intersection control and traffic data collection. The in-ground inductive loops basically utilize wire loops placed in the pavement, for detecting the presence of vehicles through magnetic induction. Many limitations exist with point detection devices such as inductive loops. For example, inductive loops are expensive to install, difficult to maintain, and cannot classify vehicles. More recent traffic sensor systems use radar, active audio, such as ultrasound beams, or video to detect or classify vehicles. These systems can not only be used as detection devices for highway monitoring but also can provide more detailed information from a traffic scene. While active audio systems utilizing transmission and detection of audio signals have been used, passive audio systems have not yet been widely developed. Passive audio systems can utilize relatively inexpensive sensing devices while potentially covering a wide area. Further, passive audio systems are insensitive to weather and light conditions.

Classification type neural networks can be used to recognize and classify input patterns based on example patterns used to train the networks during a training phase. Neural networks are systems that are deliberately constructed to make use of some of the organizational principles from the human brain. Neural networks use a highly parallel set of connections of simple computational devices to produce a classification of an input pattern. While neural networks originally were implemented using hardware, software implementations are now very common. The overall behavior of a neural network is determined by the structure and strengths of the adjustable connections, the synaptic weights, between the computational elements. The synaptic weights are adjusted during the training phase, when examples representative of those the network must ultimately classify and their correct classifications are provided to the network. After the training phase, the network is conditioned to respond uniquely to a particular input signal to provide a desired output signal. Neural networks are particularly suited for use in systems where speed and accuracy in pattern recognition is desired.

SUMMARY OF THE INVENTION

To overcome the limitations in the prior art described above, and to overcome other limitations that will become apparent upon reading and understanding the present specification, the present invention provides a system and method for classifying objects based on passive sound. Sound waves produced by objects, such as vehicles, are measured by a microphone. An analog to digital converter converts the analog signal to a digital signal which is converted into a power spectrum by a spectral analyzer. Fuzzification functions are applied to the power spectrum to create a vector of predetermined dimension that characterizes the power spectrum. A neural network then classifies the object based on the characterizing vector.

BRIEF DESCRIPTION OF THE DRAWINGS

The present invention will be more fully described with reference to the accompanying drawings wherein like reference numerals identify corresponding components, and.

DETAILED DESCRIPTION OF THE PREFERRED EMBODIMENTS

In the following detailed description of the preferred embodiment, reference is made to the accompanying drawings which form a part hereof, and in which is shown by way of illustration of a specific embodiment of which the invention may be practiced. It is to be understood that other embodiments may be utilized and structural changes may be made without departing from the scope of the present invention.

Figure 1:
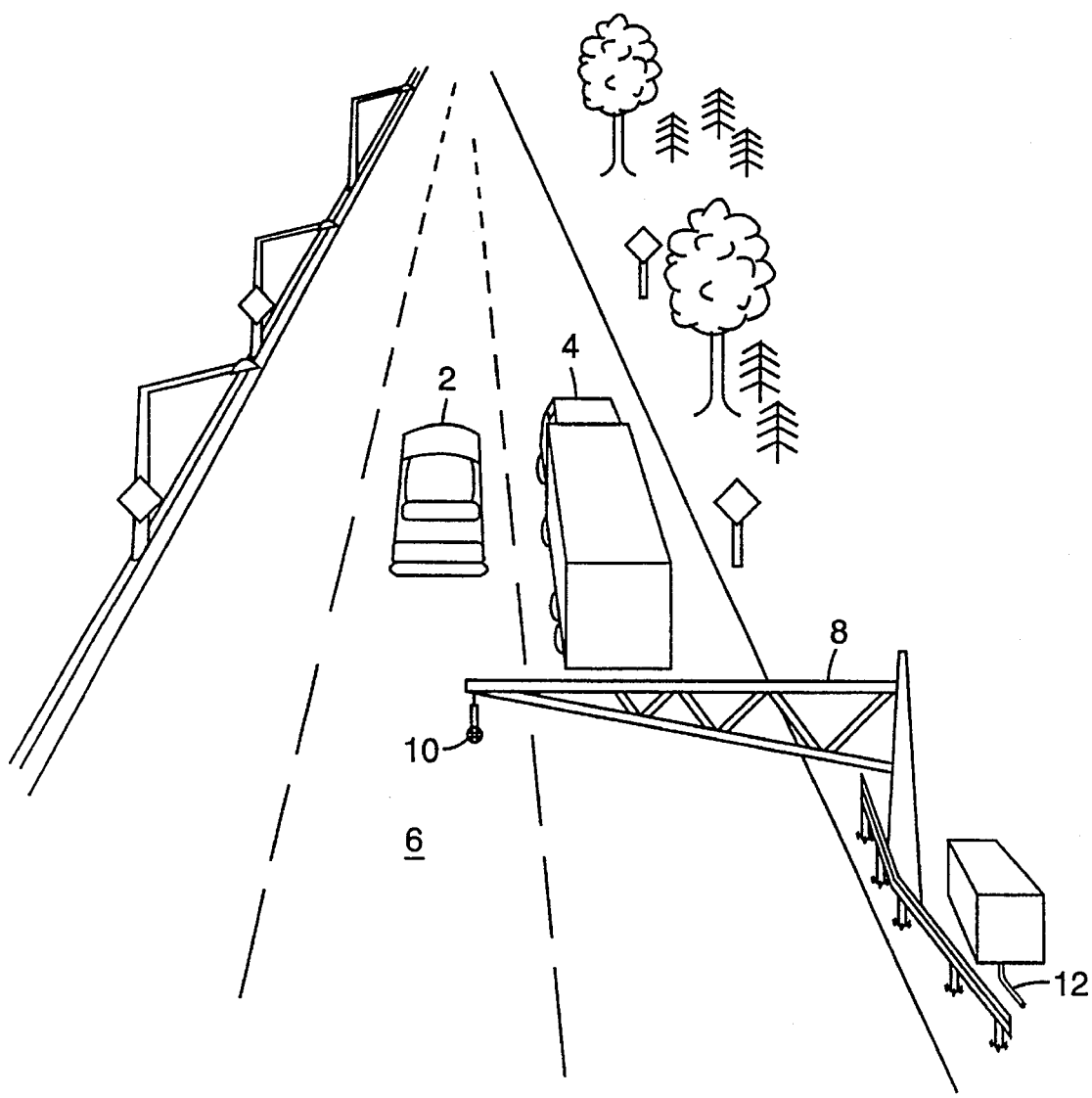
FIG. 1 shows a typical roadway scene where a microphone measures sound waves produced by vehicles to be classified.

Referring to FIG. 1, a typical roadway scene is shown. Car 2 and truck 4 are examples of different types of vehicles that travel over roadway 6. As vehicles pass structure 8, they create sound waves, which are physical disturbance patterns in the air. The magnitude of sound waves may be expressed in different ways, such as displacement, particle velocity or pressure, although the preferred measured property of sound waves is sound pressure, the fluctuation above and below atmospheric pressure which results from the sound wave. Structure 8, which may, for example, be a structure such as a bridge, a sign bridge or other supporting structure, supports microphone 10, which measures the sound waves, preferably the sound pressure level of the sound waves, as vehicles approach and pass structure 8. Microphone 10 transduces the sound energy into electrical energy. Microphone 10 produces an analog signal based on sound pressure levels as measured by microphone 10 as a function of time. The analog signal is sent to the classification system through connector 12. While FIG. 1 shows an independent passive audio sensor, such a sensor could be used in conjunction with a video system, to complement the video system, especially at night or in low visibility weather.

Figure 2:
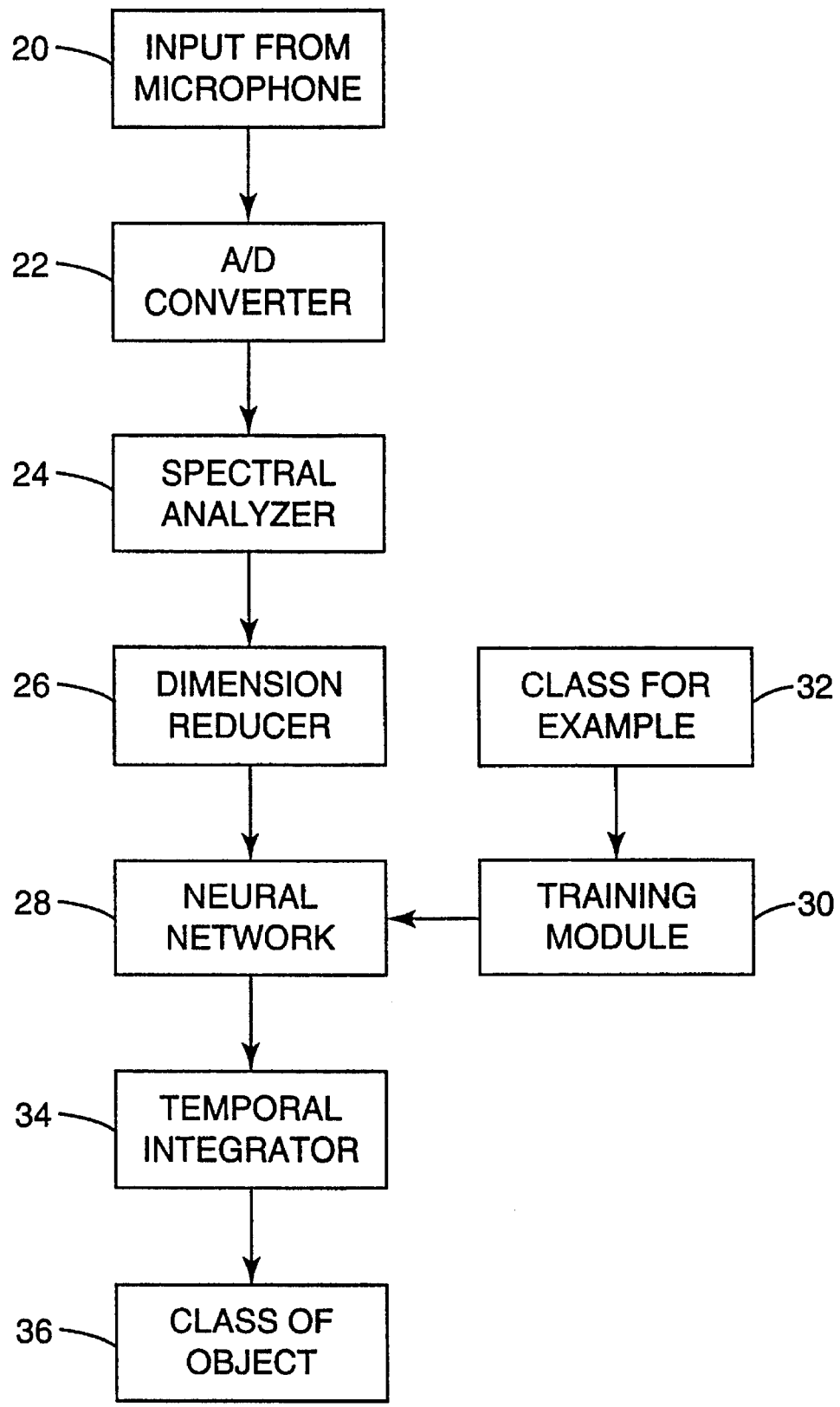
FIG. 2 is a block diagram showing the system of the present invention.

Referring to FIG. 2, a block diagram of the system for analyzing the passive audio input is shown. The analog signal representing the sound pressure levels associated with a vehicle passing microphone 10 is sent into the classifying system at input 20. Analog to digital converter 22 converts the analog signal to a set of discrete numerical values to represent the sound pressure levels. The sampling rate of analog to digital converter 22 may vary from system to system, depending on the sound emitted from the object to be classified.

Spectral analyzer 24 transforms the digitized sound pressure levels from the sound pressure domain, which is a function of time, to the frequency domain. Standard spectral conversions rely on some form of the Fast Fourier Transform (FFT). The FFT is a digital approximation of the Fourier transform. The Fourier transform of a function h(t) is as follows:

$$H(f) = \int h(t) e^{2\pi i f t} dt$$

where H(f) is a function of the frequency, f. Standard FFTs suffer from peak reduction and leakage problems when confronted with non-integer frequencies. Generally, the spectral power in one "bin," a frequency interval, contains leakage from frequency components from other bins. Data windowing is typically used to attempt to solve the leakage and peak reduction problems, but still has side effects of its own. Each data segment is multiplied, bin by bin, by the window function before the FFT is computed, to weight each data segment. A square window with unit height is equivalent to no windowing. Some examples of data windowing functions commonly used in FFT power spectral estimation include the Parzen window, the Hanning window and the Welch window. These functions all reduce leakage, although none eliminate it.

Figure 3A:
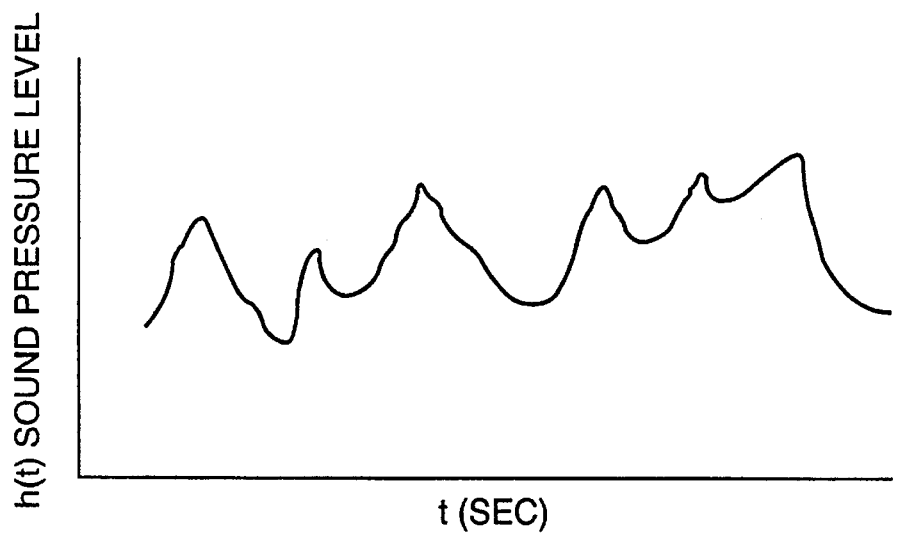
FIG. 3A shows sound pressure levels input into the system.
Figure 3B:
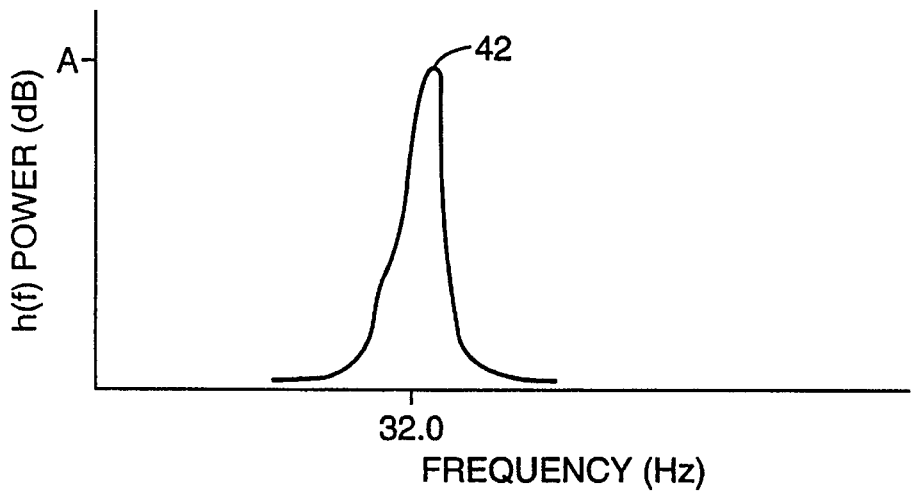
FIGS. 3B and 3C show Fourier transforms of sound pressure levels.
Figure 3C:
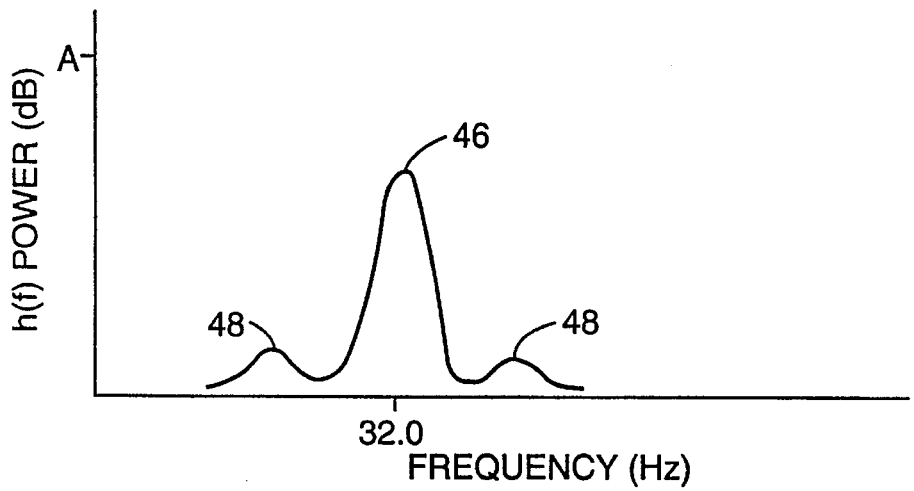

FIG. 3A shows a graph of the sound pressure levels received by the system, h(t), as a function of time. To determine the power at a particular frequency, f, the Fourier transform, H(f), of the function is computed. For example, if a predominant frequency exists at 32.0 Hz, and the Fourier transform for 32.0 Hz is computed, H(32.0), the distribution will resemble the distribution shown in FIG. 3B. Such a distribution has a peak amplitude 42 of A decibels at the frequency for which the Fourier transform was computed. If, however, the predominant frequency exists at 32.2 Hz instead of 32.0 Hz, and the Fourier transform is still computed for the one hertz wide bin centered at 32.0 Hz to determine the power at 32.0 Hz, the power distribution will resemble the distribution shown in FIG. 3C. The distribution of FIG. 3C has sidelobes 48, which cause a reduction in peak amplitude 46 to an amplitude of less than A decibels. If the Fourier transform was computed for the frequency 32.2 Hz, however, a distribution similar to the distribution shown in FIG. 3B would result, except the central peak would be centered at 32.2 Hz. Thus, the peak reduction caused by computing the Fourier transform at 32.0 Hz when the predominant frequency was at 32.2 Hz results in a central peak which is not indicative of the actual power that exists at that particular frequency.

Spectral analyzer 24 does not use a windowing function thereby avoiding the peak reduction tendencies of data windowing. Instead, spectral analyzer 24 first performs a Fast Fourier Transform at a plurality of fractional offsets from the characterizing frequency of each bin. For example, within a one hertz wide bin with a characterizing frequency of 32.0 Hz and including the frequencies between 31.5 Hz and 32.5 Hz, spectral analyzer 24 could transform eleven discrete frequencies, each discrete frequency offset 0.1 Hz. Spectral analyzer 24 then analyzes the FFT at each discrete frequency to determine where the predominant frequency is within the bin. In one embodiment, spectral analyzer 24 finds the predominant frequency within the bin by comparing the FFT at each offset frequency and determining at which frequency the highest central peak exists. The highest central peak will have the least leakage and the maximum power and will represent the frequency closest to the predominant frequency within the bin. The number of discrete frequencies that spectral analyzer 24 analyzes within a bin depends on the degree of accuracy desired. For higher accuracy, frequencies analyzed are separated by a smaller interval. For example, for more accuracy than the aforementioned 0.1 Hz intervals, spectral analyzer could analyze frequencies at smaller intervals, such as 100 signals in 0.01 Hz intervals.

Figure 4A:
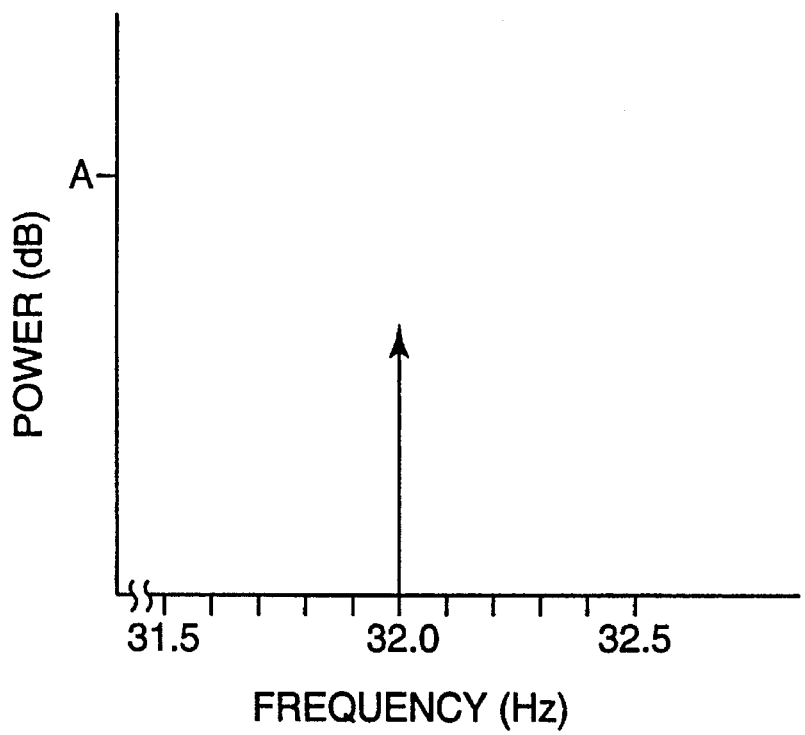
FIGS. 4A and 4B show Fast Fourier Transforms of a sound pressure input at discrete frequencies within a bin.
Figure 4B:
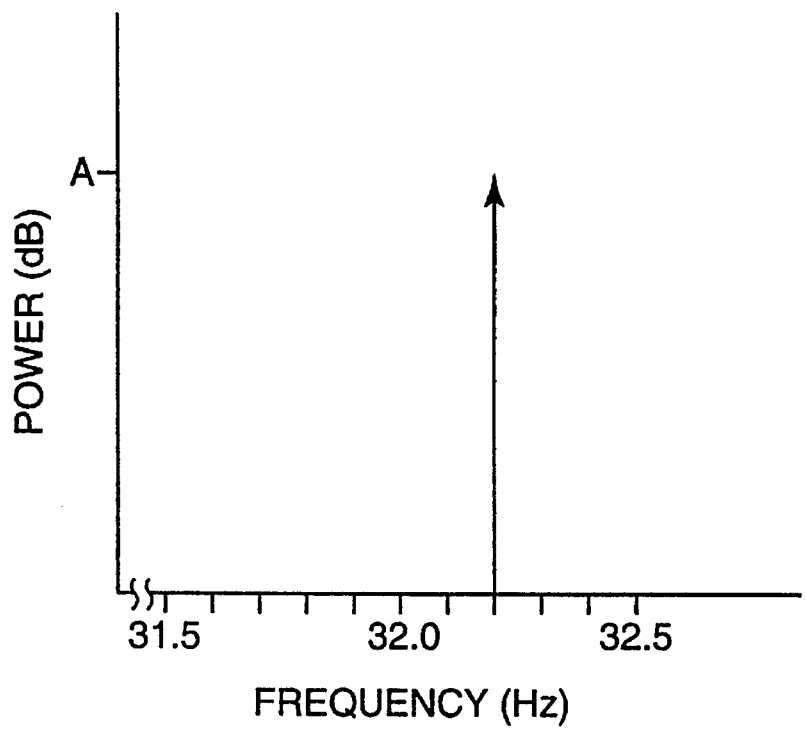

Spectral analyzer 24 then selects the signal with the maximum power value and sets all other values to zero. The selected maximum power value is substituted for the power value of the characterizing frequency of the bin to represent the power in the bin. For example, in FIGS. 4A and 4B, the predominant frequency within the bin centered at 32.0 Hz is 32.2 Hz. The FFT of the characterizing frequency of the bin, 32.0 Hz, suffers from peak reduction, as shown in FIG. 4A. Spectral analyzer 24 avoids the peak reduction problem by substituting the power value of 32.2 Hz, as shown in FIG. 4B, which is closer to the predominant frequency within the bin and therefore better approximates the power within the bin, for the lower power value at 32.0 Hz. Thus, spectral analyzer 24 selects the maximum power value, H(f), within the bin to represent the bin.

Figure 5:
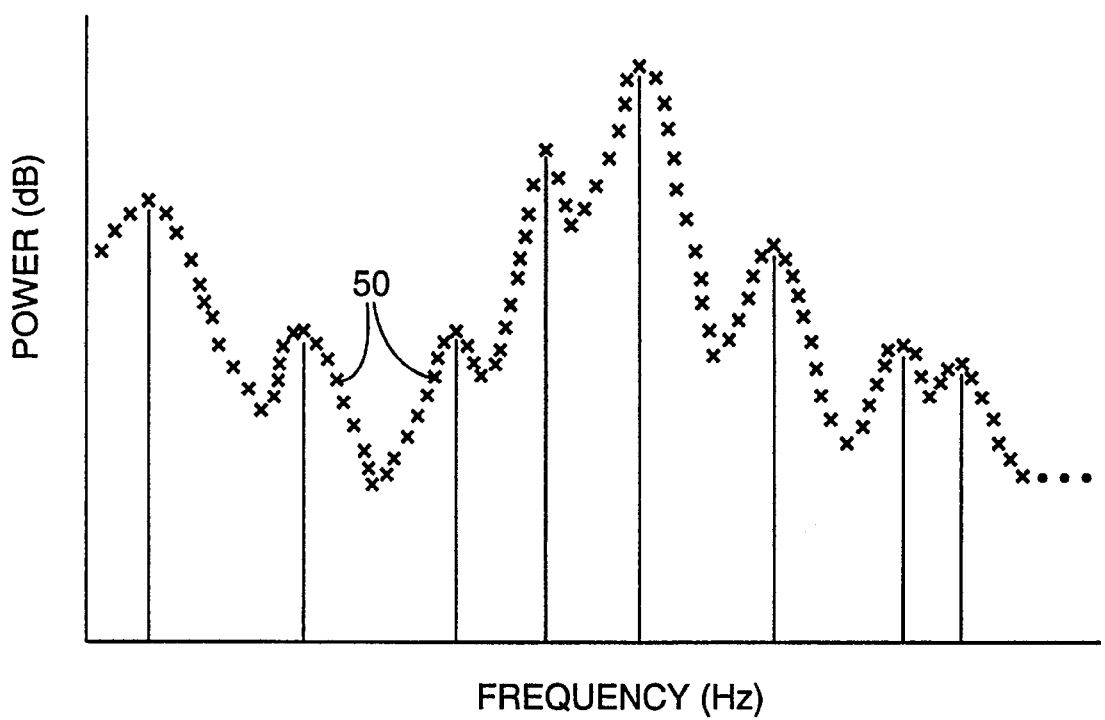
FIG. 5 shows a digitized power spectrum.

The output of spectral analyzer 24 is a power spectrum, or power spectral density, of the input function showing the amount of energy present at each particular frequency bin. Because the input signal, the sound pressure levels, was digitized at A/D converter 20, the output of spectral analyzer 24 is a stream of discrete points representing the power at each frequency, as shown in FIG. 5. Rather than transmitting as an output the power at all frequencies, spectral analyzer 24 can be configured to output only predominant frequencies in the sound pressure levels, thereby facilitating classification of the objects. In one embodiment, spectral analyzer 24 only sends the power from the frequency bins as an output if the power in the bin is at a local maxima, such as local maxima points 50. In another embodiment, spectral analyzer 24 only sends the power of frequency bins of the highest N peaks as an output, where N is some predetermined number.

Returning to FIG. 2, the power spectrum, as shown in FIG. 5, is received by dimension reducer 26. The power spectrum may be represented by a vector with a number of dimensions equal to the total number of possible frequencies. In the preferred embodiment, however, most of the frequencies have a power value of zero, since only the power values at the local maxima are preserved at spectral analyzer 24. For example, if there are 512 frequencies bins, of which only a minority of frequencies have non-zero values, a 512 dimensional vector is of a higher dimension than is required for the amount of information provided. Thus, it is desirable to reduce the dimensionality of the vector according to the expected nature of the sound data. Sound data with a typically large number of distinct frequencies may require a higher dimensionality while sound data with a smaller number of distinct frequencies can be represented by a vector with a lower dimensionality.

Figure 6:
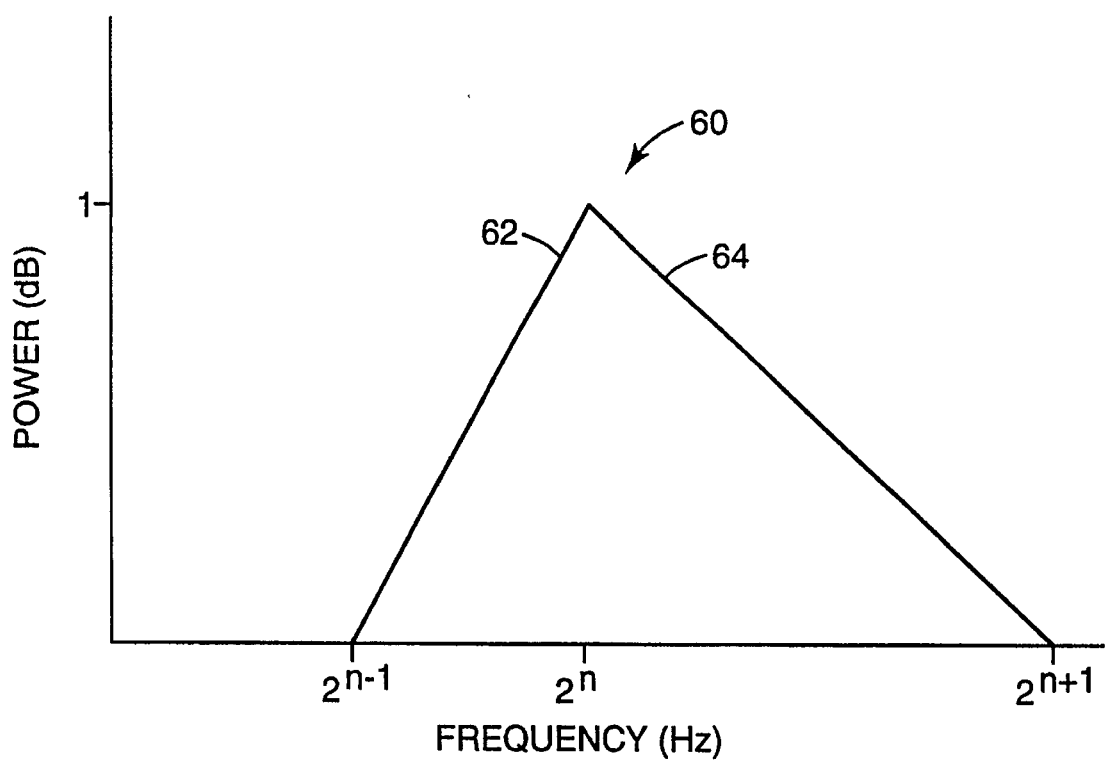
FIG. 6 shows a fuzzification function used to produce the vector characterizing the power spectrum.

Dimension reducer 26 performs fuzzification on the received power spectrum to reduce the dimension, specifically, by applying overlapping fuzzification functions to the spectrum. FFTs have a natural bias toward lower frequencies. Thus, a fuzzification function is needed which is wider at higher frequencies to undo that natural bias. Fuzzification is accomplished by convolution of the power spectrum with a set of nonsymetrical functions as shown in FIG. 6. In a preferred embodiment, fuzzification function 60 is wedge shaped, having a unit height and centered at a characterizing frequency of $2^n$, where n is an integer. The range of n varies depending on the range of frequencies that the system receives. First leg 62 of fuzzification function extends between frequencies $2^{n-1}$ and $2^n$ while second leg 64 extends between frequencies $2^n$ and $2^{n+1}$. More specifically, fuzzification function is defined between the frequencies of $2^{n-1}$ and $2^n$ as:

$$y = \frac{x - 2^{n-1}}{2^n - 2^{n-1}}$$

and is defined between the frequencies of $2^n$ and $2^{n+1}$ as:

$$y = -\frac{x - 2^{n+1}}{2^{n+1} - 2^n}$$

where x is the frequency and y is the height of said function.

Figure 7:
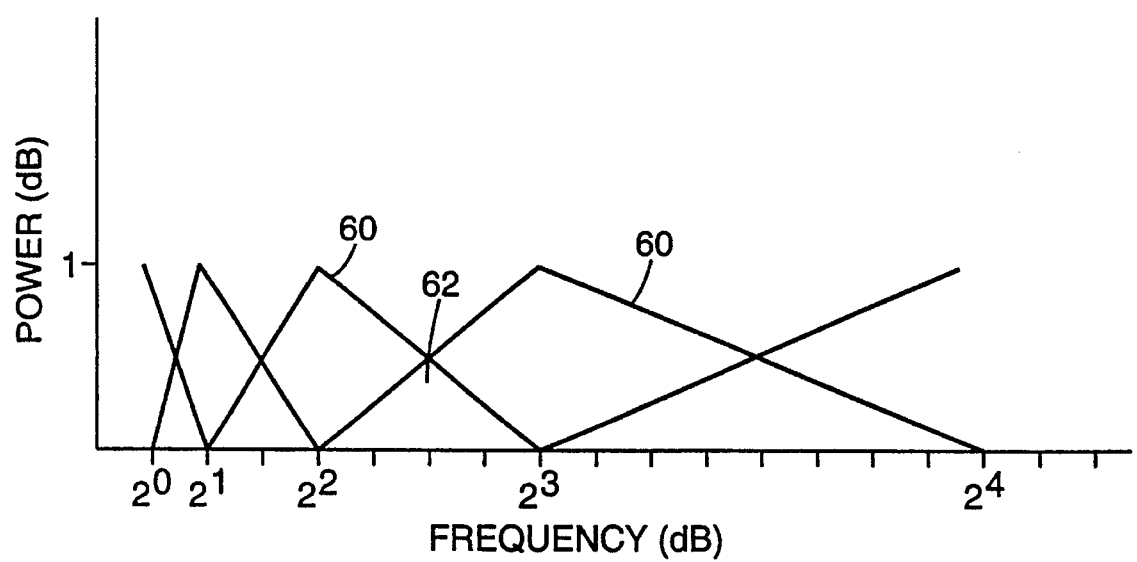
FIG. 7 shows a plurality of overlapping fuzzification functions.

Fuzzification functions 60 have overlapping regions 62 where they are non-zero, as shown in FIG. 7. Each fuzzification function 60 determines how much energy is "near" the frequency at which function 60 is centered. It does so by convolution, or by multiplying the height of function 60 by the amount of energy at each discrete frequency and summing the products. The set of n functions will reduce the dimensionality of the vector to n dimensions. Fuzzification function n corresponds to the $n^{th}$ component of the output vector. Data after the dimension reduction process has the additional effect of being less redundant than in the frequency form. For example, at higher frequencies, two adjacent bins have similar wavelengths, thereby having redundant information. On the other hand, at lower frequencies, the information contained in two adjacent frequencies will represent very different wavelengths. The asymmetric fuzzification functions group together more high frequency bins than corresponding low frequency bins. The vector data produced by dimension reducer 26 also has a property that is desirable for input to neural networks, namely that the vector undergoes small displacements in the vector space when there are small changes in energy at a particular frequency or for small frequency shifts.

Neural network 28 is a classification type neural network. Neural network 28 receives as input the vector produced by dimension reducer 26 and transmits as output a classification designator indicative of the class of the object associated with the input vector. A preferred embodiment of a classification neural network for use with the present invention is described in commonly-assigned U.S. patent application entitled "Facet Classification Neural Network," filed on Dec. 8, 1993 and now U.S. patent application Ser. No. 08/163, 825, which is hereby incorporated by reference.

Before neural network 28 can perform its task of classification, it must be trained such that its synaptic weights are appropriately set for proper classification. Training module 30 receives training data, which includes example sound wave data as well as correct classification of the example data. Training data are vectors representing sounds over a predetermined period of time. The predetermined period is chosen such that the frequency characteristics of the sound are fairly constant, which will vary according to each application. In one embodiment of classifying vehicles, a time period of 0.1 second per sample is used. If the period chosen is too short, the sound sample will not contain enough information to provide a signature of the vehicle. If the period is too long, on the other hand, the component frequencies may change in mid-sample, producing unpredictable effects. Training module 30 then searches the training data for examples of sounds which are similar but which belong to opposite classes. A method of training the preferred neural network is described in the aforementioned U.S. patent application entitled "Facet Classification Neural Network." These identified examples provide potential elements to be included in the final classification model of neural network 28, as embodied in the synaptic weights. Once all potential model elements are identified, training module 30 prunes the network, by allowing the model elements to compete to be included in the final model. The smallest necessary and sufficient subset of model elements is selected for inclusion. A preferred pruning method is also described in the "Facet Classification Neural Network" patent application.

Neural network 28 produces a class designator for each vector received from dimension reducer 26. Each vector represents a predetermined time interval, typically a short time interval to allow correct classification of the object generating the sound. Thus, in the aforementioned embodiment wherein the predetermined time interval is 0.1 seconds, neural network 28 produces a class designator every 0.1 seconds for each sound sample. Neural network 28 classifies each vector independently. Therefore, it is possible that not all of the classifications will be uniform for a stream of vectors representing the many samples which make up a single vehicle's audio signature. Temporal integrator 34 is a post-processor which analyzes the stream of class designators from neural network 28. Temporal integrator 34 combines the results over time and creates an integrated result which is the output of the entire system. In a preferred embodiment, temporal integrator 34 counts the number of classification designators in each class, the class with the greater number of classification designators being the class of the vehicle.

Figure 8:
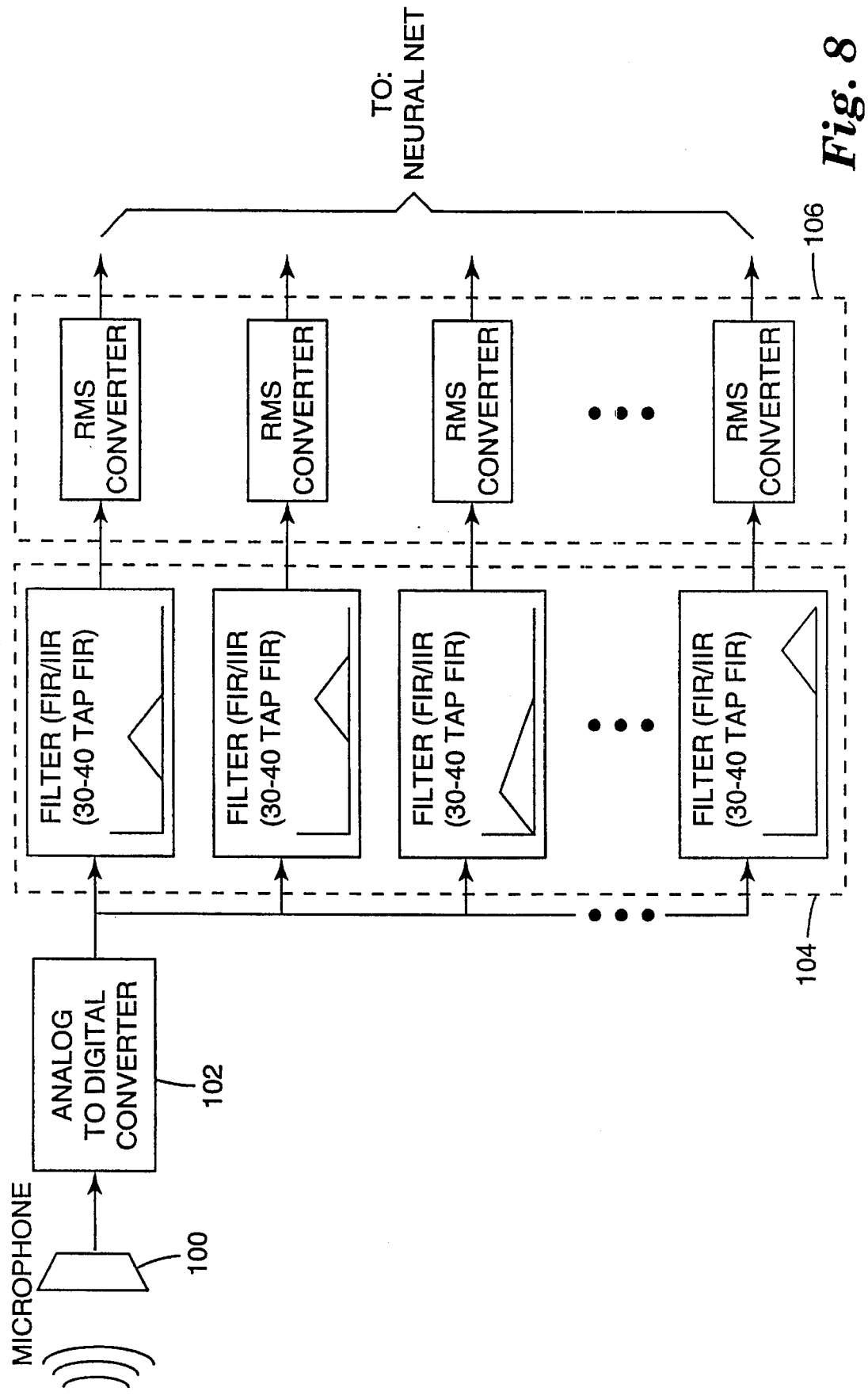
FIG. 8 shows a hardware implementation of the present invention.
Figure 8A:
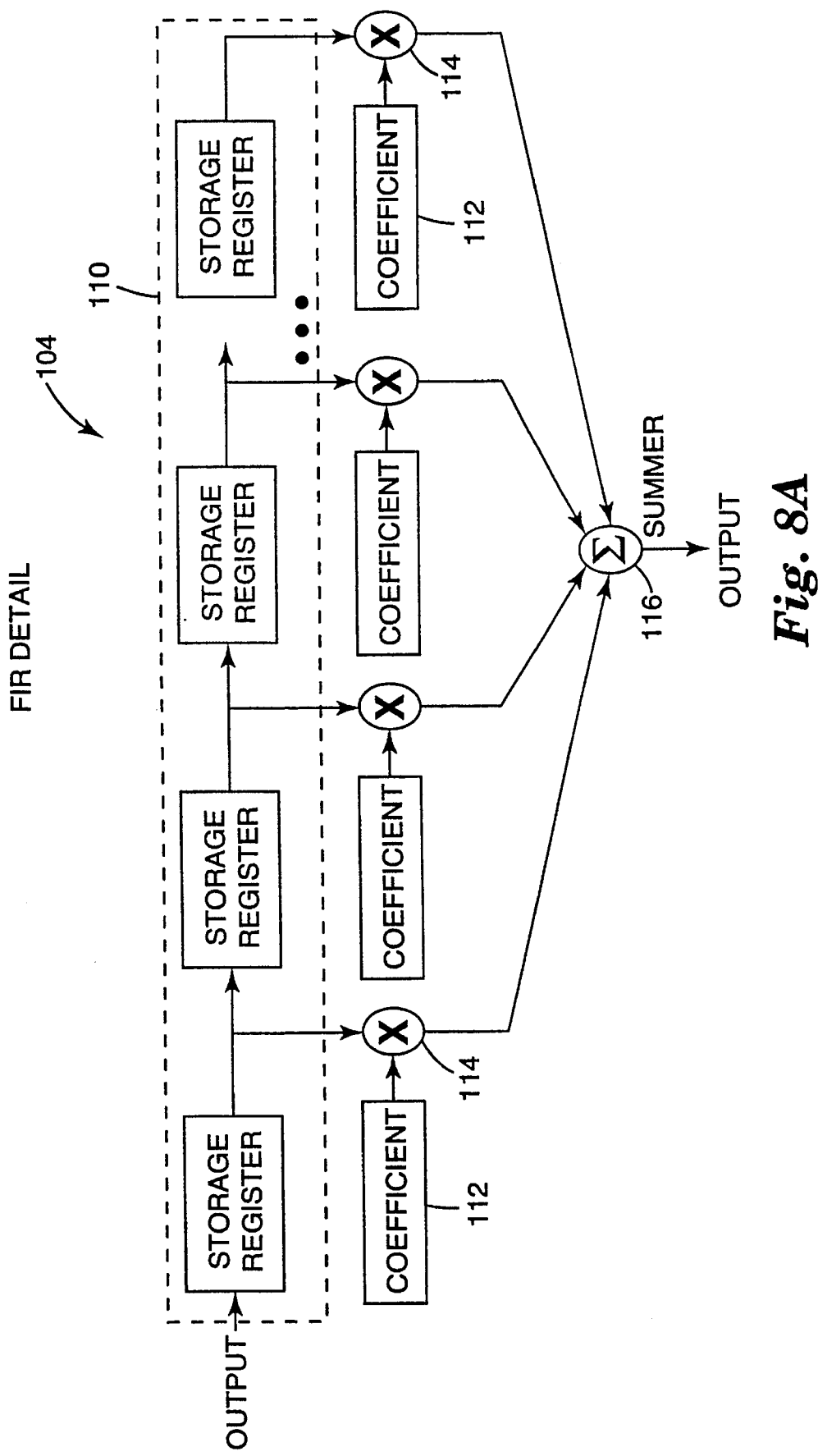
FIG. 8A shows a schematic diagram of a finite impulse response filter.
Figure 8B:
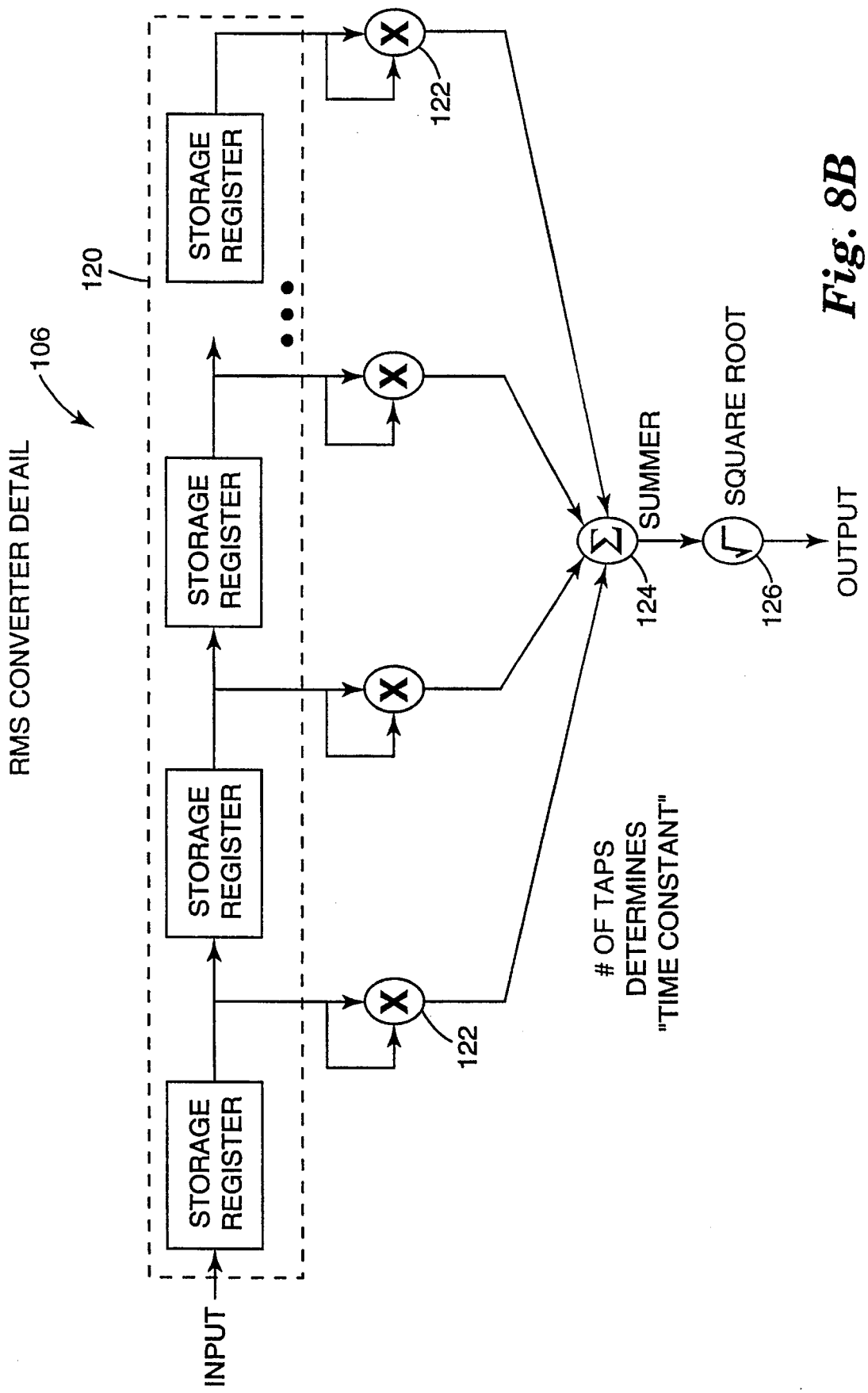
FIG. 8B shows a schematic diagram of a root mean square converter.

Referring to FIGS. 8, 8A and 8B, a hardware implementation of the present invention will be described. While a hardware implementation is described, those skilled in the art will readily recognize that the present invention can be implemented using hardware, software, or any combination thereof. Further, while a digital implementation is described, a continuous time implementation could also be used by utilizing corresponding analog components. Microphone 100 transduces sound waves into an analog electrical signal. Analog to digital converter 102 receives the analog signal and converts it to a digital signal. The digital signal is sent in parallel to a plurality of filters 104. Filters 104 fuzzify the digital signal over particular frequencies, by applying fuzzification functions to the signal. In one embodiment, filters 104 are a plurality of finite impulse response (FIR) filters. Each FIR filter characterizes the signal over different frequency bands by applying a transfer function defined by a characterizing frequency. The outputs of all FIR filters perform the function of fuzzifying the original digital signal. Preferably, FIR filters apply overlapping wedge-shaped waveforms to the signal, the characterizing frequency of each waveform being A, where A represents the frequency of the peak in the transfer function, each filter having a different value for A. The wedge-shaped waveforms are defined between the frequencies of B and A as:

$$y = \frac{x-B}{A-B}$$

and defined between the frequencies of A and C as:

$$y = -\frac{x-A}{C-A}$$

where x is the frequency and y is the height of the transfer function. For frequencies above C and below B, x is zero.

Referring to FIG. 8A, a more detailed diagram of a digitally implemented n-tap FIR filter is shown. The output from the A/D converter is received by a first of n storage registers 110, each of which act as delays as the data is shifted to subsequent storage registers. The number of storage registers, n, depends on the resolution required to get sufficient approximation of the waveform applied by the filter. For an embodiment where filters 104 apply the aforementioned wedge-shaped functions, a 30 to 40-tap FIR filter is a typical range of storage registers chosen. Thirty to 40 storage registers are chosen because they result in about a one percent error in approximating the ideal frequency response of the wedge-shaped functions. The more storage registers that are used, the better the FIR filter will approximate the ideal frequency response. Lower frequency bands also require more storage elements to achieve the same level of approximation error. As data bits are shifted to subsequent storage registers, each data bit is multiplied by a weighting coefficient 112 corresponding to a storage register at multiplier 114. The products are summed at summer 116 to provide the filter output. Thus, the output of a FIR filter is a linear time convolution of the weighting coefficients and the digital input signal. Alternatively, filters 104 may be infinite impulse response (IIR) filters which utilize feedback paths to reduce the number of multipliers and storage locations required, or may be implemented using comparable analog type components.

Referring back to FIG. 8, the output of each filter 104 is received by a corresponding root mean square (RMS) converter 106. Each RMS converter 106 approximates the amount of power in the frequencies received from the corresponding filter. FIG. 8B shows a more detailed diagram of a digital embodiment of RMS converters 106. Storage registers 120 receive data bits from the corresponding filter. The data bits are squared at multiplier 122 and summed at summer 124. The square root of the sum of squares is taken at 126, providing the output of RMS converter 106. The number of taps, or storage registers, determines the time constant, which determines the interval over which events affect the output of converter 106. In an alternative embodiment, a digital to analog converter can convert the output of filters 104 to an analog signal, and RMS converter 106 can be implemented using analog components. The output of RMS converters 106 are sent to the neural network, which then produces a classification designator for the object.

Although a preferred embodiment has been illustrated and described for the present invention, it will be appreciated by those of ordinary skill in the art that any method or apparatus which is calculated to achieve this same purpose may be substituted for the specific configurations and steps shown. It is intended that this covers any adaptations or variations of the present invention. Therefore, it is manifestly intended that this invention be limited only by the appended claims and the equivalents thereof.

What is claimed is:

1. A passive audio classification system for classifying an object emitting sound, said system comprising:
   an analog to digital converter for converting analog sound wave characteristics associated with said object to digital sound wave characteristics;
   means for converting said digital sound wave characteristics, said digital sound wave characteristics measured from a time interval, into a power spectrum;
   means for applying a fuzzification function to said power spectrum to create a vector of a predetermined dimension, said vector characterizing said power spectrum; and
   a neural network for receiving said vector and for producing a classification designator based on said vector.

2. The passive audio classification system according to claim 1, further comprising processor means for analyzing classification designators produced by said neural network over a plurality of said time intervals and for generating a signal indicative of the class of said object.

3. The passive audio classification system according to claim 1 further comprising measuring means for measuring analog sound wave characteristics of said sound emitted from said object.

4. The passive audio classification system according to claim 3, wherein said measuring means is a microphone.

5. The passive audio classification system according to claim 1, wherein said means for converting said digital sound wave characteristics minimizes peak reduction when converting said digital sound wave characteristics to said power spectrum.

6. The passive audio classification system according to claim 1, wherein said means for converting said digital sound wave characteristics only outputs predominant frequencies in the power spectrum.

7. The passive audio classification system according to claim 6, wherein said means for converting said digital sound wave characteristics outputs a power value of frequencies where said power value is at a local maximum.

8. The passive audio classification system according to claim 6, wherein said means for converting said digital sound wave characteristics outputs a power value of frequencies when said power values are one of a predetermined number of highest local maxima.

9. The passive audio classification system according to claim 1, wherein said means for applying said fuzzification function applies a predetermined number of overlapping asymmetric wedge shaped functions to said power spectrum to create said predetermined dimensional vector.

10. The passive audio classification system according to claim 9, wherein each of said overlapping asymmetric wedge shaped functions has a unit height, is centered at a frequency of $2^n$ and is defined between the frequencies of $2^{n-1}$ and $2^n$ as:

$$y = \frac{x - 2^{n-1}}{2^n - 2^{n-1}}$$

and is defined between the frequencies of $2^n$ and $2^{n+1}$ as:

$$y = -\frac{x - 2^{n+1}}{2^{n+1} - 2^n}$$

where x is the frequency and y is the height of said function.

11. The passive audio classification system according to claim 1, wherein said analog sound wave characteristics associated with said object are sound pressure levels.

12. The passive audio classification system according to claim 1, wherein said means for converting said digital sound wave characteristics comprises a root mean square converter.

13. The passive audio classification system according to claim 1, wherein said means for applying a fuzzification function to said power spectrum comprises a finite impulse response filter.

14. A method of classifying an object emitting sound, said method comprising the steps of:

receiving analog sound wave characteristics associated with said object, said analog sound wave characteristics measured from a time interval;

convening said analog sound wave characteristics to digital sound wave characteristics;

converting said digital sound wave characteristics to a power spectrum;

applying a fuzzification function to said power spectrum to create a vector of a predetermined dimension for characterizing said power spectrum; and producing a class designator at a neural network based on said vector.

15. The method of classifying an object emitting sound according to claim 14, further comprising the steps of analyzing classification designators produced by said neural network for a plurality of said time intervals and generating a signal indicative of the class of said object.

16. The method of classifying an object emitting sound according to claim 15, wherein the step of analyzing classification designators from a plurality of said time intervals comprises the steps of:

comparing the number of class designators in each different class; and determining which said class has the greatest number of class designators.

17. The method of classifying an object emitting sound according to claim 14, further comprising the step of minimizing peak reduction when converting digital sound wave characteristics to said power spectrum.

18. The method of classifying an object emitting sound according to claim 17, wherein minimizing peak reduction comprises the steps of:

dividing a frequency bin into a predetermined number of frequency intervals;

converting said digital sound wave characteristics at each of said predetermined frequency intervals to said power spectrum, each converted frequency having a central peak;

analyzing said series of converted signals to determine which converted signal has the highest central peak; and assigning a power value from said signal with the highest central peak for said power value of said frequency bin.

19. The method of classifying an object emitting sound according to claim 17, wherein the step of dividing a frequency bin comprises the step of dividing said frequency bin into intervals of 0.1 Hz.

20. The method of classifying an object emitting sound according to claim 14, wherein applying fuzzification functions to said power spectrum comprises the steps of:

convoluting each of a plurality of fuzzification functions over a range of frequencies to produce a convoluted result, each said function centered at a characterizing frequency; and assigning each said convoluted result to a corresponding component of said vector.

21. The method of classifying an object emitting sound according to claim 20 wherein said characterizing frequency of each said function is $2^n$ and wherein said function is defined between the frequencies of $2^{n-1}$ and $2^n$ as:

$$y = \frac{x - 2^{n-1}}{2^n - 2^{n-1}}$$

and is defined between the frequencies of $2^n$ and $2^{n+1}$ as:

$$y = -\frac{x - 2^{n+1}}{2^{n+1} - 2^n}$$

where x is the frequency and y is the height of said function.

22. The passive audio classification system according to claim 1 wherein the objects that are classified are vehicles.

* * * * *